UNITED STATES PATENT OFFICE.

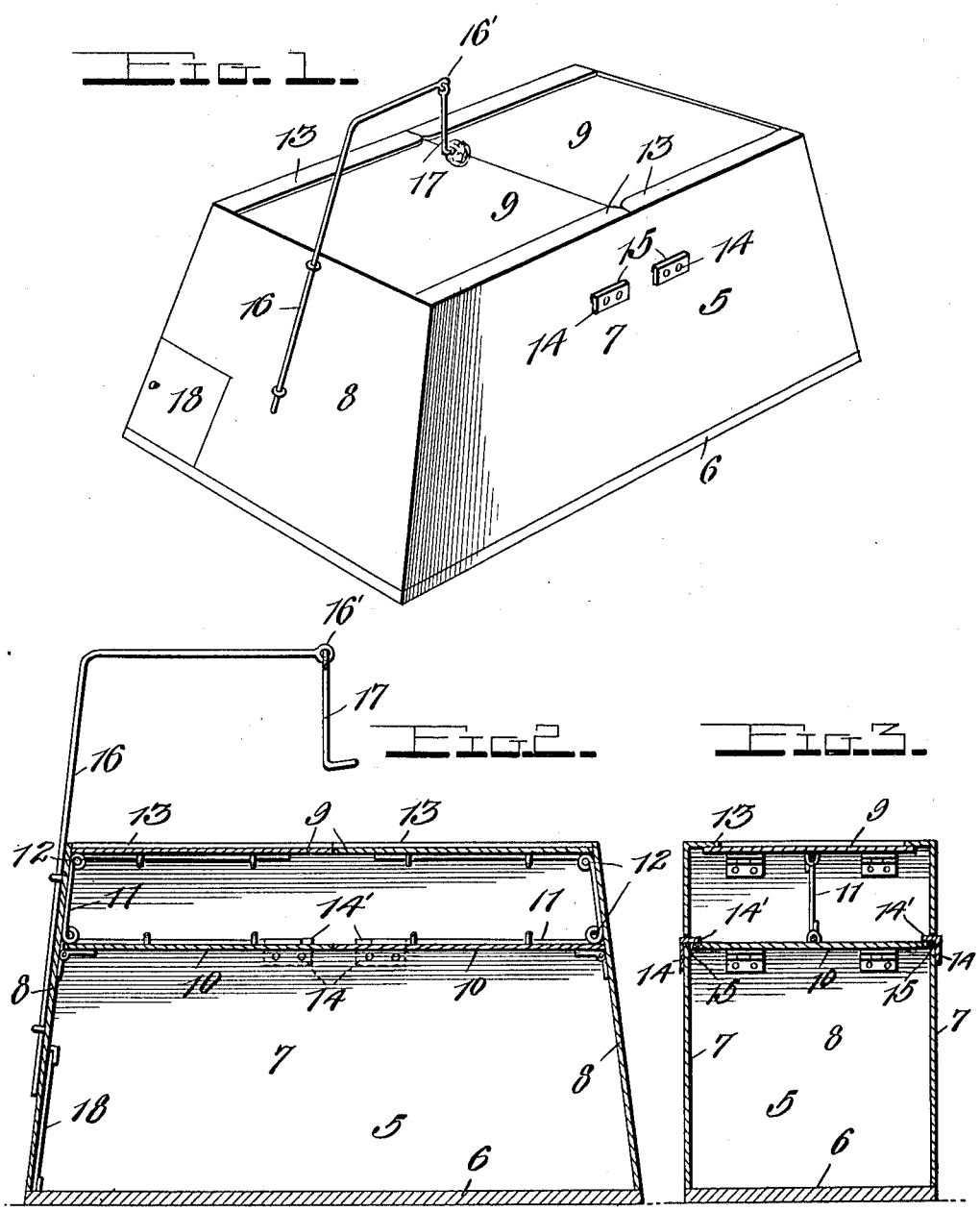

CARLETON E. WALCOTT, OF WATERBURY, CONNECTICUT.

ANIMAL-TRAP.

1,022,115.　　　　　Specification of Letters Patent.　　Patented Apr. 2, 1912.

Application filed October 17, 1910. Serial No. 587,528.

*To all whom it may concern:*

Be it known that I, CARLETON E. WAL-COTT, a citizen of the United States, residing at Waterbury, in the county of New Haven and State of Connecticut, have invented certain new and useful Improvements in Animal-Traps, of which the following is a specification, reference being had to the accompanying drawings.

This invention relates to animal traps and more particularly to a trap which is especially adapted for the trapping of rats, mice or other rodents, the invention having for its principal object the provision of a trap of this character of very simple construction and one which is highly efficient in practical use.

A further object of the invention is to provide a trap which may be readily constructed at a small cost and from which the escape of the animals is rendered impossible.

With these and other objects in view, the invention consists of the novel features of construction, combination and arrangement of parts, hereinafter fully described and claimed, and illustrated in the accompanying drawings, in which—

Figure 1 is a perspective view of an animal trap constructed in accordance with my invention; Fig. 2 is a vertical longitudinal section through the same; and Fig. 3 is a vertical transverse section thereof.

Referring more particularly to the drawings 5 designates a body consisting of a base 6, vertical longitudinal side members 7 and the inwardly inclined end members 8. These body parts are all rigidly connected together in any desired manner. To the upper ends of the end members 8 one end of a pair of doors 9 is hinged, and a second pair of doors 10 are arranged in parallel relation beneath the doors 9 and are also hinged to the end members 8 of the body of the trap. A length of resilient spring wire 11 is arranged between the trap doors 9 and 10 at the hinged ends thereof, said wire having a plurality of coils 12 formed therein upon each side of its center, said coils being disposed at the hinged edges of the doors. The ends of the wires 11 are secured to the opposed surfaces of the upper and lower trap doors 9 and 10 and normally act to force said doors upwardly between the sides 7 of the body. Stop flanges 13 are secured to the upper edges of the sides 7 and limit the upward movement of the upper doors 9. Stop plates 14 have short angularly disposed end portions 14' which extend through slots 15 in the sides 7 of the body and engage the lower doors 10 to limit their upward movement. The stop plates 14 may be secured to the sides of the trap by means of screws or other suitable fasteners.

A bait holding rod 16 is slidably arranged upon one end 8 of the body of the trap and extends above the same. The upper end of this rod is disposed in longitudinal parallel relation to the top of the trap and has an eye 16' formed in its ends to be engaged by a hook formed on the end of a bait rod 17 as clearly shown in Fig. 1. The end of the rod 16' is disposed immediately above the inner opposed ends of the upper trap doors 9. By arranging the bait rod 16 slidably in eyes secured to the end wall 8 as shown, said rod may be moved downwardly into close engagement with the end and top of the trap for convenience in packing and shipping. In one end of the trap body a sliding door 18 is arranged whereby the animals after being caught may be conveniently removed.

From the above it is believed that the construction and operation of my improved trap will be readily understood. Upon the animal treading on either of the upper trap doors 9, they will immediately give beneath his weight and lower between the sides 7 of the trap. These doors engaging the lowermost doors 10 will also cause the latter doors to move downwardly whereby the animal is deposited by the inclined plates into the bottom of the trap. This downward movement of the trap doors places the spring coils 12 under sufficient tension to immediately return the doors to their normal positions after the animal is caught. It will thus be seen that the escape of the animal is rendered impossible as it would be necessary to force two of the trap doors upwardly between the sides of the box in order for him to escape. This upward movement is effectually prevented by means of the stops 13 and 14.

A trap constructed in accordance with my invention is simple, light, easily baited and may be manufactured at an extremely low cost. In the baiting of the ordinary trap employing a heavy coiled spring, there is considerable danger of the person setting the trap having his fingers caught therein and badly lacerated. By means of my device this danger is entirely eliminated while the efficiency of the trap is in nowise detracted from.

While I have shown and described the preferred construction and arrangement of the various parts, it will be understood that the device is susceptible of considerable modification without departing from the essential feature or sacrificing any of the advantages thereof.

Having thus described the invention what is claimed is:—

A trap comprising a receptacle, downwardly tilting cover plates hinged to the opposite walls in the same plane and meeting in the center, downwardly tilting partition plates hinged to the opposite walls and meeting at the center in a plane beneath the cover plates, plate sustaining springs having one terminal portion secured beneath the cover plate and the other terminal portion secured above the partition plate and the medial portion arranged along the wall between the two plates, said springs having coils connecting the medial and terminal portions in the angles formed by said plates with the walls, stops for the cover plates, additional stop members for the partition plates, said stops limiting the upward movement of said plates, and a bait holding device disposed above the cover plate.

In testimony whereof I hereunto affix my signature in the presence of two witnesses.

CARLETON E. WALCOTT.

Witnesses:
 WILLIAM J. HYDE,
 CHARLES H. DAVIS.

Copies of this patent may be obtained for five cents each, by addressing the "Commissioner of Patents, Washington, D. C."